United States Patent
Hong et al.

(10) Patent No.: US 8,376,537 B2
(45) Date of Patent: Feb. 19, 2013

(54) COMPOSITION OF ROTOGRAVURE HOTMELT INK CONTAINING POLYPROPYLENE CARBONATE

(75) Inventors: SeungGweon Hong, Daejeon (KR); JaeYoung Park, Wonju-si (KR); HyeLim Kim, Busan (KR); Kwang Jin Chung, Daejeon (KR); Myung Ahn Ok, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 17 days.

(21) Appl. No.: 13/213,470

(22) Filed: Aug. 19, 2011

(65) Prior Publication Data

US 2012/0157592 A1    Jun. 21, 2012

(30) Foreign Application Priority Data

Dec. 15, 2010  (KR) .......................... 10-2010-0128520
Aug. 3, 2011   (KR) .......................... 10-2011-0077528

(51) Int. Cl.
*C09D 11/10* (2006.01)

(52) U.S. Cl. ............................ 347/88; 524/145; 524/270
(58) Field of Classification Search .................. 524/145, 524/270; 347/88
See application file for complete search history.

(56) References Cited

FOREIGN PATENT DOCUMENTS

| JP | 2000-72992 A | 3/2000 |
| KR | 10-2009-0090154 A | 8/2009 |
| KR | 10-2010-0013255 A | 2/2010 |
| KR | 10-2010-0067593 A | 6/2010 |

*Primary Examiner* — Vu A Nguyen
(74) *Attorney, Agent, or Firm* — The Webb Law Firm

(57) ABSTRACT

Provided is an eco-friendly rotogravure hot melt ink composition. More specifically, the present invention provides the rotogravure hot melt ink composition meeting requirements of a carbon footprint system by using, as a vehicle, poly propylene carbonate prepared using carbon dioxide as a raw material. The rotogravure hot melt ink prepared by the composition of the present invention has a higher printing density and more easily performs printing at low temperature than a poly vinyl acetate based hot melt ink according to the related art.

11 Claims, 1 Drawing Sheet

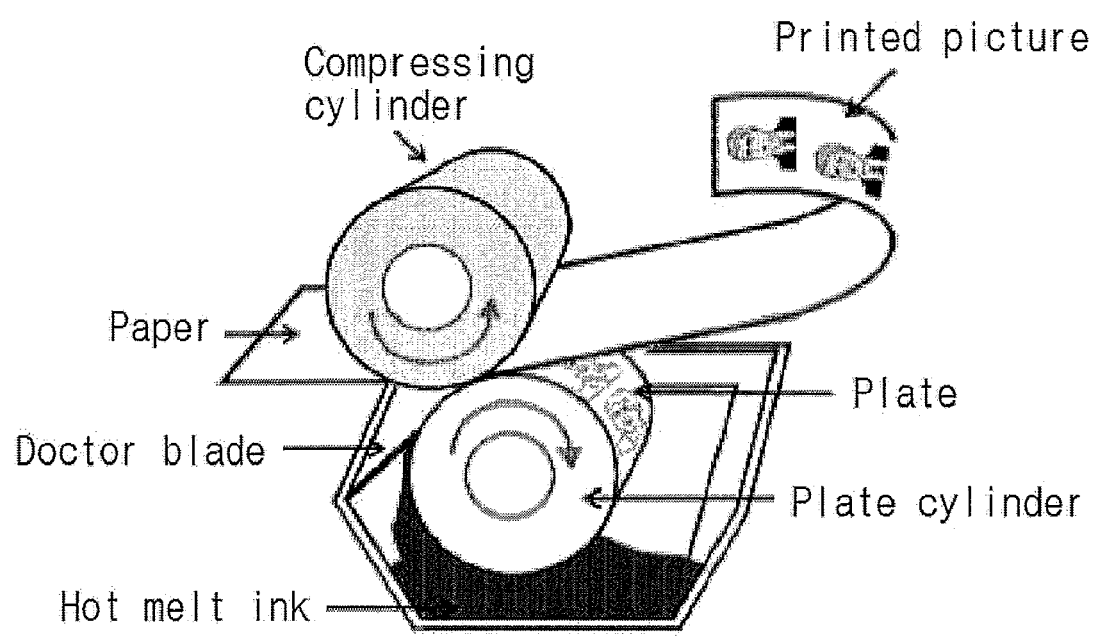

COMPOSITION OF ROTOGRAVURE HOTMELT INK CONTAINING POLYPROPYLENE CARBONATE

TECHNICAL FIELD

The present invention relates to a rotogravure hot melt ink composition, and more particular, to a rotogravure hot melt ink composition including a colorant and a vehicle, wherein the vehicle includes polypropylene carbonate that is resin acquired by polymerization reaction of dioxide carbon and propylene oxide. A hot melt ink product according to an exemplary embodiment of the present invention has excellent printability while being eco-friendly hot melt ink meeting a carbon footprint system.

BACKGROUND ART

Gravure printing means a printing type that covers a concave plate formed by corroding a flat plate with ink and scratches extra ink by doctor blade. Ink used herein is referred to as gravure ink. Unlike general gravure ink using a solvent, rotogravure hot melt ink uses ink melted by heating. Therefore, the rotogravure ink is eco-friendly gravure ink that does not discharge volatile organic compound or hazardous air pollutants.

The gravure ink has been prevalently applied in a plastic package industry such as a plastic package for foods, medicine, forage, agricultural products, and household goods. In particular, the gravure ink has been mainly used for a food package, or the like. However, due to in order to the environmental harmfulness caused by a solvent used for ink, a change to an eco-friendly product has been requested. As an alternative capable of using merits of the gravure printing while overcoming the environmental harmfulness, the rotogravure hot melt ink has been suggested.

The hot melt ink is made of a colorant and a vehicle. As the vehicle, poly (ethyl vinyl acetate) based resin is generally used. Japanese Patent Laid-Open Publication No. 2000-072992 discloses hot melt ink that uses poly (ethyl vinyl acetate) based resin as a vehicle and controls viscosity and pigment dispersibility, or the like, using alcohol and wax. Generally, the poly (ethyl vinyl acetate) based resin having a softening point of 160 to 170° C. is used about 60 to 70%, the wax having a melting point of 80 to 90° C. is used about 10 to 20%, and the alcohol having a high boiling point such as stearyl alcohol is used about 20 to 30%. These vehicle mixtures may include a small amount of additives such as dispersant, antioxidant, ultraviolet absorbent, or the like. A ratio of the vehicle to the pigment including the additive is about 98:1 to 80:20. In particular, the wax and the alcohol in the composition are an important fact of determining the melting point of the hot melt ink. The wax and the alcohol having the high boiling point, which are used to control the melting velocity, serve to lower adhesion, which makes it difficult to increase color density of the hot melt ink using the poly (ethyl vinyl acetate) based resin as the vehicle.

CITATION LIST

Patent Document (Patent Document 1) Japanese Patent Laid-Open Publication No. 2000-072992 (SEKISUI CHEM CO LTD) 2000 Mar. 7.

Technical Problem

An object of the present invention is to provide an eco-friendly rotogravure hot melt ink composition including poly propylene carbonate as a vehicle to perform printing at low temperature while increasing dispersion stability of pigment and adhesion to printed matters.

Technical Solution

The present invention relates to a rotogravure hot melt ink composition using poly propylene carbonate from carbon dioxide as a vehicle, and more particularly, to a hot melt ink composition including a colorant and a vehicle, wherein the vehicle includes (a) poly propylene carbonate; and (b) tackifier selected from rosin based compound, toll oil-based compound, natural or synthetic terpene compounds, terpene-phenol based resin, and C5-C9 petroleum based resin. The hot melt ink composition according to the exemplary embodiment of the present invention may have the merits of the gravure printing while using the eco-friendly resin.

The present invention relates to a rotogravure hot melt ink having a new composition using poly propylene carbonate as a vehicle, and more particularly, to eco-friendly hot melt ink free from harmfulness of VOC or HAPs while surpassing printability of poly (ethyl vinyl acetate) based resin based hot melt ink used in the related art.

The poly propylene carbonate is eco-friendly polymer represented by the following Chemical Formula 1 and is obtained by copolymerizing carbon dioxide and propylene oxide. Since the carbon dioxide is used as a material of the polymer, carbon balance during a manufacturing process is resin represented by negative (−).

[Chemical Formula 1]

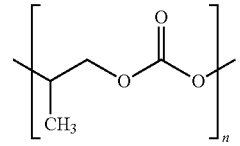

[n is 10 to 10000.]

The poly propylene carbonate may be prepared by a method well-known in Korean Patent Laid-Open Publication Nos. 2009-0090154, 2010-067593, 2010-0013255, or the like.

The present invention relates to the gravure ink composition including a colorant and a vehicle and the poly propylene carbonate as the vehicle. Hereinafter, the present invention will be described in detail.

(a) the poly propylene carbonate used as the vehicle of the hot melt ink composition according to the present invention is obtained by the polymerization reaction of the carbon dioxide and the propylene oxide, wherein the poly propylene carbonate may have a weight-average molecular weight of 10,000 g/mol to 50,000 g/mol. The poly propylene carbonate resin having the molecular weight larger than 50,000 has high melting viscosity and low compatibility with the tackifier, which makes it difficult to obtain the uniform vehicle composition. The poly propylene carbonate resin having the molecular weight smaller than 10,000 has continuous surface stickiness and low tensile strength when being plasticized. The poly propylene carbonate having the molecular weight in the range can improve the adhesion of the rotogravure hot melt ink composition, lower the melting viscosity of the composition to 70 to 90° C., and make the printability, the color stability, and the dispersibility excellent. In addition, due to the characteristics of the poly propylene carbonate, when the gravure hot melt ink wastes are combusted, NOx is not generated and when the gravure hot melt ink wastes are buried, they may be easily decomposed by ion to additionally implement the eco-friendly characteristics.

The vehicle of the hot melt ink composition according to the present invention, which is a material serving to increase the adhesion of the hot melt adhesive together with the poly propylene carbonate, includes the tackifier, wherein the tackifier is selected from rosin based compound, toll oil-based compound, natural or synthetic terpene compounds, terpene-phenol based resin, and C5-C9 petroleum based resin. The softening point of the tackifier may be in the range of 70 to 150° C. When the softening point is higher than 150° C., the compatibility with the low molecular weight poly propylene carbonate is degraded and the melting viscosity of the hot melt ink composition is increased. On the other hand, when the softening point is lower than 70° C., the melting viscosity is too low and the stickiness still remains even when degrading temperature after printing. In particular, the rosin based compound has the improved ink transparency, the good solubility of the colorant, and the excellent adhesion with the medium. More preferably, as the rosin based compound, rosin ester, hydrogenated rosin ester, disproportionated rosin ester, dibasic acid modified rosin ester, polymerized rosin ester, and phenol modified rosin ester may be used. More preferably, the rosin based compound having the softening point of 70 to 90° C. may be used.

The vehicle according to the present invention may include 60 to 95 wt % of poly propylene carbonate and 5 to 40 wt % of tackifier. In particular, the vehicle may include 80 to 90 wt % of poly propylene carbonate and 10 to 20 wt % of tackifier.

The hot melt ink composition according to the present invention includes the vehicle and the colorant, wherein the colorant may be 2 to 20 wt % and the vehicle may be 80 to 90 wt %. If the colorant is a dye and a pigment of a base, any colorant may be used without any problem. As the pigment, all the pigments generally used for printing may be used regardless of an inorganic pigment and an organic pigment. In the present invention, as the usable pigment, carbon black, cadmium red, molybdenum red, chromium yellow, cadmium yellow, titanium yellow, chromium oxide, titanium cobalt green, cyan blue, cobalt blue, azo based pigment, phthalocyanine pigment, quinacridone based pigment, isoindolinone based pigment, parylene based pigment, thioindigo based pigment, metal complex pigment, or the like, may be used by way of example, which may be used alone and may be used as a mixture of the plurality of pigments. In addition, as the dye, metal complex salt dye, naphthol dye, anthraquinone dye, indigo dye, carbonium dye, quinone imine dye, cyanine dyes, quinoline dye, nitro dye, nitroso dye, benzoquinone dye, naphthoquinone dye, phthalocyanine dyes, metal phthalocyanine dye, or the like, may be used by way of example, which may be used alone and may be used as a mixture of the plurality of dyes.

The vehicle of the ink composition according to the present invention may further include a plasticizer so as to allocate flexibility, easiness of working, and stretch property to the poly propylene carbonate resin, wherein the plasticizer may be added 5 to 15 wt % based on the poly propylene carbonate. The plasticizer includes an aliphatic dibasic acid ester based plasticizer, a phosphate ester based plasticizer, or the like. The aliphatic dibasic acid ester is obtained by condensation reaction of the dibasic acid fatty acid having 3 to 7 carbon atoms and alcohol having four or less carbon atoms. Preferably, 1 to 4 mols of propylene oxide is added to a positive carboxyl group of the dibasic acid fatty acid and then, the condensation reaction is performed on the alcohol having four or less carbon atoms, which is represented by compound of the following Chemical Formula 2.

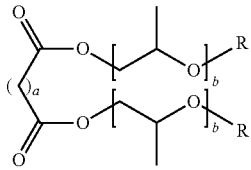

[Chemical Formula 2]

[In the above Chemical Formula 1, a represents an integer 1 to 5, b represents an integer of 0 to 4, and R represents hydrogen or (C1-C4)alkyl.]

The phosphate ester based plasticizer may be tricrecyl phosphate. Other plasticizers may be separated after the hot melt ink is prepared due to the low compatibility between the poly propylene carbonate and the rosin based mixture such as the phenol modified rosin ester, or the like.

The hot melt ink composition according to the present invention may further include at least one selected from oxidation stabilizer and ultraviolet absorbent and may be added 0.5 to 10 wt % based on the poly propylene carbonate. The antioxidant is a material increasing stability against heat and may use ones being shipped to the market and the ultraviolet absorbent is to prevent the fading of ink and the decomposition of resin and may also use ones being shipped to the market.

An example of additives used for the hot melt ink according to the present invention may include a dispersant, a slip agent, an antifoaming agent, or the like, and may be used alone or as a mixture thereof.

Advantageous Effects

The present invention can provide the gravure hot melt ink composition having the high adhesion of the poly propylene carbonate, the excellent compatibility with the tackifier such the phenol modified rosin ester, or the like, and the excellent printability increasing the color density after printing, while meeting the carbon footprint system by providing the rotogravure hot melt ink having the new composition replacing the poly ethyl acetate resin based rotogravure hot melt ink of the related art with the poly propylene carbonate and implementing the eco-friendly merits by using the landfill disposable biodegradable resin.

DESCRIPTION OF DRAWINGS

The above and other objects, features and advantages of the present invention will become apparent from the following description of preferred embodiments given in conjunction with the accompanying drawings, in which:

FIG. 1 is a diagram showing a method of printing rotogravure hot melt ink.

BEST MODE

Hereinafter, a detailed description of the present invention will be provided by way of example with reference to the accompanying drawings. However, the present invention is not limited to the following Example. FIG. 1 is a view showing a method for identifying proper storage of goods requiring storage at a low temperature according to the present invention.

Hereinafter, the present invention will be described in more detail with reference to the following examples. However, the following examples describe the present invention by way of example only and therefore, the present invention is not limited to the following examples.

The poly propylene carbonate used in the present invention was prepared based on the description of Korean Patent Laid-Open Publication Nos. 2009-0090154, 2010-067593, and 2010-0013255.

Example 1

A vehicle was prepared by adding 14 g of phenol modified rosin ester to 75 g of poly propylene carbonate resin of which the weight-average molecular weight is 20,000 g/mol, adding 10 g of ester [compound of Chemical Formula 2, where a=3, b=2, R=CH3] obtained by condensation of 2 equivalent of methyl dipropylene glycol ether to aliphatic dibasic acid, that is, glutaric acid, adding 0.5 g of butylated hydroxyl toluene (BHT) as phenol based antioxidant and 0.5 g of 2,4-Dihydroxybenzo phenone as ultraviolet absorbent thereto, and mixing them at 160° C. for five minutes using a Brabender mixer. A sample having a thickness of 2 mm was prepared using a heating PBHss after adding 3 g of pigment (phthalocyan blue) to the above-mentioned vehicle of 100 g and again mixing them using the Brabender mixer. The viscosity of the prepared hot melt ink sample was measured at 120° C. and stored at 0° C. and 100° C. for three days, the separation degree of the benzo phenone and the pigment was confirmed, and the uniform surface between the vehicle components was confirmed by cutting the cross section of the sample and observing the surface thereof by a scanning electron microscope. In addition, the elongation was measured using a UTM to measure plasticity. The printing was performed using a K-Printing Proofer and then, the color reflective density was measured, there by measuring the printability. The above measurement results are arranged in Table 1.

Example 2

Example 2 is the same as Example 1 except that Example 1 uses the Tricrecyl phosphate as the plasticizer.

Example 3

Example 3 is the same as Example 1 except that Example 1 uses the poly propylene carbonate of which the weight-average molecular weight is 50,000 g/mol.

Comparative Example 1

Comparative Example 1 is the same as Example 1 except that Example 1 uses the poly propylene carbonate of which the weight-average molecular weight is 5,000 g/mol.

Comparative Example 2

Comparative Example 2 is the same as Example 1 except that Example 1 uses the poly propylene carbonate of which the weight-average molecular weight is 100,000 g/mol.

Comparative Example 3

Comparative Example 3 is the same as Example 1 except that Example 1 uses dioctylphthalate as the plasticizer.

Comparative Example 4

Comparative Example 4 is the same as Example 1 except that Example 1 uses petroleum resin instead of the phenol modified rosin ester in the vehicle component.

Comparative Example 5

The sample of Example 1 was prepared by adding 0.5 g of butylated hydroxy toluene (BHT) as the antioxidant and 0.5 g of 2,4-dihydroxybenzophenone as the ultraviolet absorbent to 65 g of the poly ethyl vinyl acetate having a vinyl acetate content of 28% of which the softening point is 165° C. as the vehicle, 25 g of stearyl alcohol, and 10 g of carnauba wax of which the softening point is 85° C. and mixing them by the Brabender mixer, followed by adding 3 g of pigment (phthalocyann blue) to 100 g of the vehicle and mixing well, and the physical properties of the sample were measured for comparison.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| SEM | Uniform | Uniform | Uniform | Non-uniform | Non-uniform | Uniform | Non-uniform | Uniform |
| Bleeding | None | None | None | Ggeneratiion | None | Ggeneratiion | Generation | None |
| Blooming | None | None | None | None | None | Generation | Generation | None |
| Surface Stickness | None | None | None | Stickness | None | None | None | None |
| Viscosity (Pa-sec) | 9.4 | 10.2 | 9.1 | 17.4 | 500 | 35 | 53 | 10 |
| Reflective Desnsity | 1.47 | 1.53 | 1.49 | 1.12 | 1.17 | 1.23 | 0.91 | 1.37 |
| LCW Paper Adhesion | Bonding | Bonding | Bonding | Rupturing and Peeling Adhesive layer | Bonding | Peeling | Peeling | Bonding |
| Elongation (%) | 143 | 154 | 137 | 180 | 113 | 101 | 97 | 123 |

The invention claimed is:

1. A hot melt ink composition, comprising:
a colorant and a vehicle,
wherein the vehicle includes:
(a) poly propylene carbonate; and
(b) tackifier selected from rosin based compound, tall oil-based compound, natural or synthetic terpene compounds, terpene-phenol based resin, and C5-C9 petroleum based resin.

2. The hot melt ink composition of claim 1, wherein the vehicle includes 60 to 95 wt % of poly propylene carbonate and 5 to 40 wt % of tackifier.

3. The hot melt ink composition of claim 1, wherein the hot melt ink composition includes 2 to 20 wt % of colorant and 80 to 98 wt % of vehicle.

4. The hot melt ink composition of claim 1, wherein the poly propylene carbonate has a weight-average molecular weight of 10,000 g/mol to 50,000 g/mol.

5. The hot melt ink composition of claim 1, wherein the vehicle further includes 5 to 15 wt % of plasticizer, based on the poly propylene carbonate.

6. The hot melt ink composition of claim 1, wherein the vehicle further includes 0.5 to 10 wt % of at least one selected from an oxidation stabilizer and an ultraviolet absorbent, based on the poly propylene carbonate.

7. The hot melt ink composition of claim 5, wherein the plasticizer is at least one selected from a phosphate ester based compound and an aliphatic dibasic acid ester based compound.

8. The hot melt ink composition of claim 7, wherein the plasticizer is tricrecyl phosphate or an aliphatic dibasic acid ester based compound of the following Chemical Formula 2;

[Chemical Formula 2]

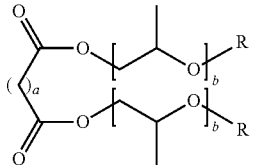

wherein, a represents an integer 1 to 5, b represents an integer of 0 to 4, and R represents hydrogen or (C1-C4) alkyl.

9. The hot melt ink composition of claim 1, wherein the rosin based compound is selected from rosin ester, hydrogenated rosin ester, disproportionated rosin ester, dibasic acid modified rosin ester, polymerized rosin ester, and phenol modified rosin ester.

10. The hot melt ink composition of claim 1, wherein the tackifier has a softening point in a range of 70 to 150° C.

11. The hot melt ink composition of claim 4, wherein the poly propylene carbonate is obtained by polymerization reaction of carbon dioxide and propylene oxide.

* * * * *